March 24, 1931.   A. S. NIELSON ET AL   1,798,102

REAR BRAKING SYSTEM FOR MOTOR VEHICLES

Filed Nov. 14, 1928

INVENTORS
ANDREW SIDLING NIELSON
ROBERT SCOTT ABERNETHY

BY Featherstonhaugh & Co

ATTORNEYS

Patented Mar. 24, 1931

1,798,102

UNITED STATES PATENT OFFICE

ANDREW SIDLING NIELSON AND ROBERT SCOTT ABERNETHY, OF MARPOLE, BRITISH COLUMBIA, CANADA

REAR BRAKING SYSTEM FOR MOTOR VEHICLES

Application filed November 14, 1928. Serial No. 319,381.

Our invention relates to improvements in rear braking systems for motor vehicles, which is adapted for use on internal expanding, external contracting or any other type of brakes. In motor cars as at present designed great difficulty is experienced in adjusting the brakes of the rear wheels so as to prevent one brake gripping before the other and the sideslipping of the vehicle which invariably follows if the speed to be checked is high or the surface of the road upon which the vehicle is travelling is at all slippery, such defect has been materially increased since the advent of the balloon tire, and no brake adjustment has been found to equalize the take up of opposing brakes, if the traction of one tire differed from that of the other, or if the air pressure in the tires varied even to a slight degree. In the braking system of the rear wheels of a vehicle as at present designed, the power from both foot pedal and parking brake lever is applied to the brake arm by a tensional strain which is usually compensated to some degree through an equalizer, but as soon as one brake starts to impede the rotation of its wheel the frame tends to overrun that wheel and the tension on the rod leading to that particular brake arm is instantly increased, causing the rotation of the wheel to be arrested before a similar retardation can be imparted through the equalizer to the opposite wheel, resulting in a side slip of the car which is so frequently dangerous. It is with the object of correcting these defects and so arranging the parts associated with a pair of rear brakes as to provide for an equal braking application to both rear wheels that this invention is designed.

The invention consists essentially of interposing members, between the brake lever or pedal of a motor vehicle and the brake arms of the rear wheels, through which the effort exerted on said lever or pedal is applied by thrust rather than by a tensional strain, as will be more fully described in the following specification and shown in the accompanying drawings, in which:—

In the drawings like characters of reference indicate corresponding parts in each figure.

Figure 1:
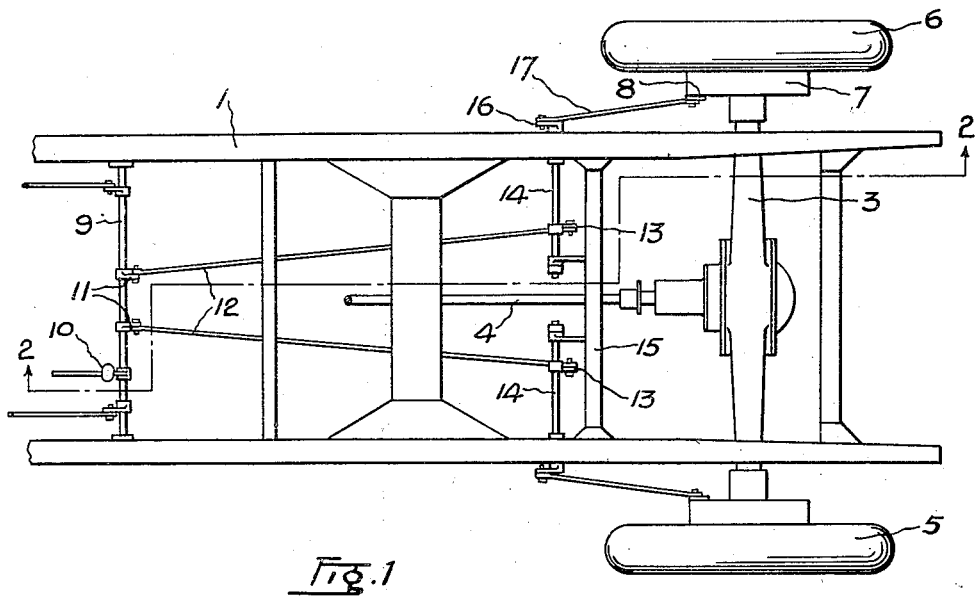
Fig. 1 is a plan view of the invention.
Figure 2:
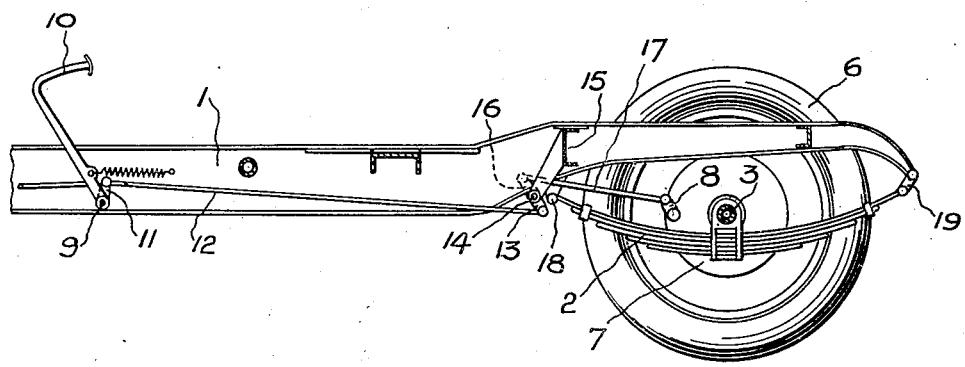
Fig. 2 is a longitudinal section taken on the line 2—2 of Figure 1.
Figure 3:
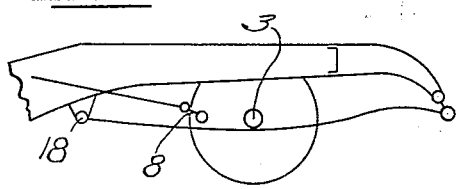
Figure 3 is a diagrammatic view showing the relative positions of the spring on the initial application of the brake.

The numeral 1 indicates the rear portion of the frame of a car having suitable springs 2, a rear axle 3, a torque shaft 4 and a pair of rear wheels numbered 5 and 6 respectively, which are fitted with brakes 7 of any suitable type actuated through brake arms 8, which in this instance are adapted to be swung in a rearward direction to apply the brakes to the wheels.

The numeral 9 indicates a transverse shaft which is adapted to be rocked by a pedal 10 or other suitable lever and is fitted with a pair of parallel arms 11 to which are pivotally connected a pair of pull rods 12 leading to a similar pair of arms 13 fitted to a pair of shafts 14 suitably journalled from a frame member 15.

Upon the outer end of each of the shafts 14 is secured a substantially vertical arm 16 which combined with the arms 13 constitute a pair of levers fulcrumed intermediate their length and receiving and imparting movement from their ends. The arms 16 are connected to their corresponding brake arms 8 by push rods 17.

The springs 2 are connected to the frame in the usual way, the front ends being mounted upon a bracketed pin 18 and the rear ends being connected to the rear end of the frame by shackles 19.

Having thus described the several parts of our invention we will now briefly explain its function.

When applying the rear brakes to a forwardly moving car by depressing the pedal 10, a tensional strain is applied upon the rods 12 and a thrust is applied through the push rods 17 to the brake arms 8 to actuate the brakes 7 of the wheels 5 and 6. Assuming that the brake of the wheel 6 is adjusted to act slightly ahead of that on the wheel 5 the initial application of its brake will immediately result in a resistance being imparted to the rotation of the wheel. The impetus of the frame 1 and its load will, due to the fixed suspension of the front end of the spring upon the bracketed pin 18 cause the spring to flatten and increase the distance between the pin 18 and the axis of the wheel, and also the distance between the pin 18 and the fulcrum of the brake arm 8. This increase of distance offsets to an equal extent the push on the push rod 17 reducing or delaying the braking strain on the wheel 6 below that which would be represented by a similar depression of the brake pedal were the car standing.

The momentary delay in the application of the brake to the wheel 6 permits a braking action to come into effect on the wheel 5, thus automatically causing the braking action to be applied equally to both wheels irrespective of the adjustment of the brakes. Similarly assuming one side of the car to be loaded more heavily over its wheel 6 than its wheel 5 and that the adjustment of the brakes is exactly equalized, it will obviously follow that the wheel 6 will be slightly to the rear of the position of wheel 5 so that the tendency in applying the brake will be to effect wheel 5 first. In such a case, the initial braking of the wheel 5 will, through the forces above described cause a straightening of the spring of the said wheel and the increasing of the distance between its brake arm fulcrum and its spring front mounting, this then will delay the action on the brake of wheel 5 until the distances between the axis of the wheel and their spring front mounting will be exactly equalized when both brakes will be applied simultaneously and to an equal extent.

What we claim as our invention is:

In a motor vehicle having rear wheels an axle and spring suspension elements therefor, a brake associated with each wheel, individual brake arms connected to the brakes, a brake pedal for operating the brake arms and brakes whereby a relative longitudinal movement between the rear axle and brake rod mounting is affected for a purpose specified.

Dated at Vancouver, B. C., this 7th day of November, 1928.

ANDREW SIDLING NIELSON.
ROBERT SCOTT ABERNETHY.